(12) United States Patent
Pulido (10) Patent No.: US 8,926,417 B1
(45) Date of Patent: Jan. 6, 2015

(54) SYSTEM AND METHOD FOR AN INTERACTIVE AUDIO-VISUAL PUZZLE

(76) Inventor: Gabriel E. Pulido, Miami, FL (US)

( * ) Notice: Subject to any disclaimer, the term of this patent is extended or adjusted under 35 U.S.C. 154(b) by 0 days.

(21) Appl. No.: 13/528,272

(22) Filed: Jun. 20, 2012

(51) Int. Cl.
  *A63F 9/00* (2006.01)
(52) U.S. Cl.
  USPC .............................................. 463/9
(58) Field of Classification Search
  None
  See application file for complete search history.

(56) References Cited

U.S. PATENT DOCUMENTS

| | | | |
|---|---|---|---|
| 3,981,505 A * | 9/1976 | Odier ........................ | 273/157 R |
| 4,893,817 A | 1/1990 | Shilo | |
| 5,010,495 A | 4/1991 | Willetts | |
| 5,087,043 A * | 2/1992 | Billings et al. ............ | 273/157 R |
| 5,643,084 A * | 7/1997 | Mirsky ............................... | 463/9 |
| 5,647,796 A * | 7/1997 | Cohen ................................ | 463/1 |
| 6,211,453 B1 | 4/2001 | Kurakake | |
| 6,264,198 B1 * | 7/2001 | Stamper ..................... | 273/157 R |
| 6,589,116 B1 * | 7/2003 | Grigoriev et al. ............... | 463/35 |
| 6,756,534 B2 * | 6/2004 | Gimpelson et al. ............. | 84/610 |
| 6,790,138 B1 * | 9/2004 | Erlichman ........................ | 463/9 |
| 6,979,245 B1 * | 12/2005 | Goodwin ...................... | 446/149 |
| 7,585,216 B2 * | 9/2009 | Foster ................................ | 463/9 |
| 8,528,905 B2 * | 9/2013 | Bianco ....................... | 273/157 R |
| 2002/0111203 A1 * | 8/2002 | Chi .................................... | 463/9 |
| 2003/0162160 A1 * | 8/2003 | Horchler et al. .............. | 434/406 |
| 2003/0162161 A1 * | 8/2003 | Horchler ........................ | 434/406 |
| 2006/0267276 A1 * | 11/2006 | Farmer et al. ............. | 273/157 R |
| 2011/0031689 A1 * | 2/2011 | Binder ....................... | 273/157 R |
| 2011/0148040 A1 * | 6/2011 | Bianco ....................... | 273/157 R |
| 2012/0122066 A1 * | 5/2012 | Dohring et al. ............... | 434/308 |
| 2013/0266924 A1 * | 10/2013 | Zelin ............................... | 434/362 |
| 2013/0341863 A1 * | 12/2013 | Weinshanker et al. ....... | 273/156 |

* cited by examiner

*Primary Examiner* — Seng H Lim
(74) *Attorney, Agent, or Firm* — Benjamin M. Hanrahan; Hanrahan Law Firm, P.A.

(57) ABSTRACT

A system and method for an interactive audio-visual puzzle is presented herein. Particularly, in order to create, design or otherwise prepare the puzzle, an audio composition and a digital object are selected and partitioned into a plurality of separate segments or pieces. For example, the composition may be partitioned in separate segments of time and the object may be separated into a plurality of visual puzzle pieces. Each of the puzzle pieces are assigned or associated with a different one of the audio segments. The goal of the puzzle or game is for the player to reconstruct both the visual object and the audio composition by aligning the puzzle pieces in the correct order or orientation.

10 Claims, 10 Drawing Sheets

SYSTEM AND METHOD FOR AN INTERACTIVE AUDIO-VISUAL PUZZLE

BACKGROUND OF THE INVENTION

1. Field of the Invention

The present invention is generally directed to a novel system and method for an interactive audio-visual puzzle which may be executed, implemented or accessed by a computer system, such as a mobile phone, gaming system, desktop/laptop computer, etc. In particular, the present invention comprises a computer-based puzzle including a plurality of virtual puzzle pieces, wherein, in addition to a visual or graphical component, each of the puzzle pieces also comprise or is otherwise assigned an audio component corresponding to a portion or segment of an audio or musical composition. Upon user manipulated disposition of the puzzle pieces in a completed, aligned orientation, the puzzle pieces will visually and collectively represent a predetermined graphical object, and the audio components thereof will collectively correspond to a continuous portion of the audio composition.

2. Description of the Related Art

Games involving the manipulation and/or arrangement of visual puzzle pieces to recreate a final picture or graphic are known. These types of games typically involve multiple puzzle pieces that physically connect to one another in various ways and which collectively represent a final picture.

While these games may be beneficial in terms of visual education and/or stimulation, they fail to provide any audio knowledge, education or interaction. Thus, they tend to provide little to no opportunity for the development or stimulation of a user's audio skills.

Accordingly, there is a need in the art for a new puzzle game that incorporates audio and visual components that can be interactively stimulated as the user or player attempts to solve the puzzle. In particular, the proposed puzzle will include a plurality of puzzle pieces, each of which comprise a visual and audio component. When solved, the puzzle pieces will be disposed in an aligned or solved orientation revealing a graphical object and collectively playing an audio composition. The player can thus use both the audio and visual components of the pieces to assist in positioning the pieces in the correct orientation.

SUMMARY OF THE INVENTION

As will be described herein, the present invention is generally directed to a system and method for an interactive audio-visual puzzle. Particularly, in order to create, design or otherwise prepare the puzzle of the various embodiments of the present invention, an audio composition (e.g., a song, instrumental, orchestral composition, audio reading of a poem, book, or other piece, spoken words, field sound recordings, sound effects, movie soundtracks, etc.) and a digital object (e.g., a two or three dimensional image) is selected. In certain embodiments, the object at least partially corresponds to the composition in that the object may visually represent one or more aspects, meanings, settings, etc. of the selected song.

Once the composition and the object are selected, both are partitioned or broken into separate segments or pieces. For example, the composition may be partitioned in separate segments of time and the object may be separated into a plurality of visual puzzle pieces. In one embodiment, the number of puzzle pieces is equal to the number of audio segments. Accordingly, each of the puzzle pieces will be assigned a different one of the audio segments such that each puzzle piece will comprise a visual or graphic element and an audio component. It should be apparent that a single audio composition may be the subject of multiple different puzzles, each of the different puzzles comprising a different graphical object. For instance, a single song may include multiple different settings, meanings, or descriptions in that a single song may be associated with a plurality of different objects and therefore be the subject of a plurality of different puzzles. Similarly, of course, a single object (e.g., a picture of a bell) may be associated with multiple different songs or audio compositions.

The goal of the puzzle or game is for the player to reconstruct both the visual object and the audio composition by aligning the puzzle pieces in the correct order or orientation. In particular, with the puzzle pieces in the correct, solved or aligned orientation, the graphical object will be visually reconstructed and the audio composition will also be reconstructed. Specifically, in one embodiment, the object is partitioned from left to right along a single axis such that the puzzle pieces comprise vertical slices of the object from left to right. When solved, the audio components of the puzzle pieces will play the audio composition from left to right in the correct and continuous manner, as if the horizontal axis corresponds to the timeline of the audio composition. Of course, other orientations may be implemented, e.g., from top to bottom, angular, spiral, circular, along an x-axis (horizontal), y-axis (vertical), or z-axis (depth), etc., so long as there is a beginning location and an end location.

These and other objects, features and advantages of the present invention will become clearer when the drawings as well as the detailed description are taken into consideration.

BRIEF DESCRIPTION OF THE DRAWINGS

For a better understanding of the nature of the present invention, reference should be made to the following detailed description taken in connection with the accompanying drawings in which.

Like reference numerals refer to like parts throughout the several views of the drawings.

DETAILED DESCRIPTION OF THE PREFERRED EMBODIMENT

As shown in the accompanying drawings, the present invention is generally directed to a system 10 and method 100 for a computer-based interactive audio-visual puzzle. In particular, the various embodiments of the present invention comprises a computer program, software module or application, such as an interactive puzzle application, that includes a plurality or series of instructions which are interpreted, executed, run, or accessed by a computer system 12 in order to implement the system 10 and method 100 of the present invention in the intended manner, as discussed fully herein.

Figure 1:
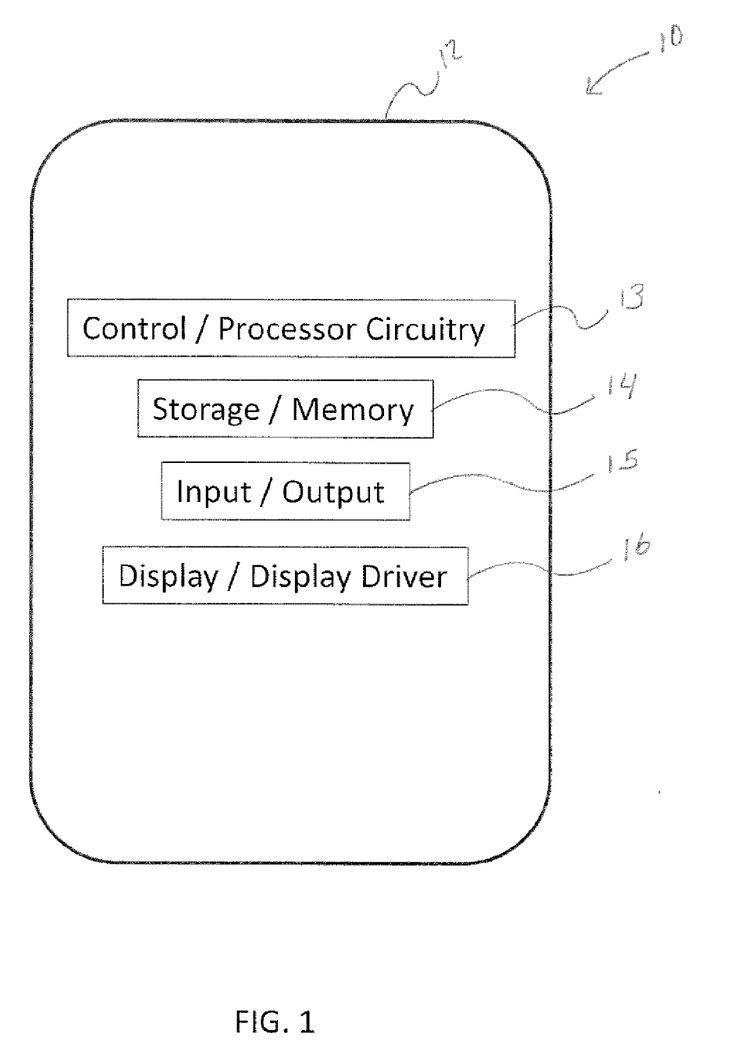
FIG. 1 is a schematic representation of the computer system used in connection with at least one embodiment of the present invention.

Particularly, referring to the high-level schematic representation, as shown in exemplary FIG. 1, the computer system 12 of at least one embodiment comprises a computer processor represented by control circuitry 13, storage and/or memory 14, and input/output circuitry 15.

Specifically, the control circuitry and/or computer processor 13 can include virtually any processing circuitry or processor operative to at least partially control the operations and performance of the computer system 12, as described in greater detail herein. For example, control circuitry 13 can be used to run, access, and/or execute various applications, modules or programs including, but not limited to, operating system applications, firmware applications, or any other application, including the interactive puzzle application as described in accordance with the present invention. In some embodiments, control circuitry 13 can drive a display 16 and process inputs received from a user interface.

Further, the storage device and/or memory 14 can include, for example, one or more storage mediums including a hard-drive, solid state drive, flash memory, permanent memory such as ROM, any other suitable type of storage component, or any combination thereof. Additionally, the storage and/or memory 14 may include cache memory, semi-permanent memory such as RAM, and/or one or more different types of memory used for temporarily storing data. Accordingly, storage and/or memory 14 is structured to store data or media including application data (e.g., for implementing functions on the computer system 12).

Moreover, the input/output ("I/O") circuitry 15 can be operative to receive and convert a user input, e.g., physical contact inputs (e.g., from a multi-touch screen), physical movements (e.g., from a mouse or sensor), analog audio signals (e.g., from a microphone), or any other input. The data can be provided to and received from control circuitry 13, storage/memory 14 or any other component of the computer system 12, including the interactive puzzle application of the present invention.

Accordingly, the computer system 12 of the various embodiments of the present invention may include, but is certainly not limited to, a mobile or handheld device (e.g., mobile telephone, media device, PDA, mobile game system, etc.), a desktop computer, laptop or mobile computer, substantially stationary gaming system (e.g., XBOX, Playstation, Wii, etc.), arcade game system, etc.

Figure 2:
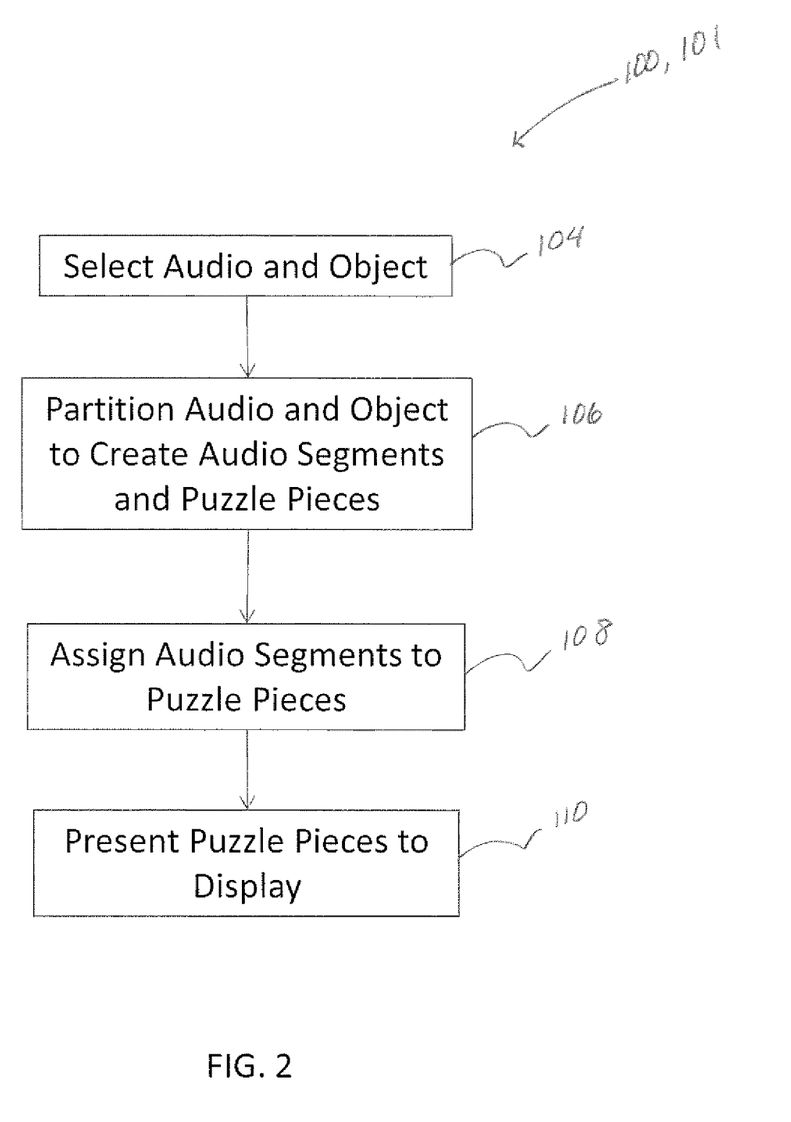
FIG. 2 is a high level flow chart illustrating the method of creating the interactive audio-visual puzzle of the present invention.

Referring now to the high-level flow chart illustrated in FIG. 2, an exemplary method 101 of creating or designing the interactive audio-visual puzzle is illustrated. In particular, the interactive audio-visual puzzle of the present invention may be created manually, for example, by an operator (with use of a computer system), or automatically by a pre-programmed computer program or module. Of course, even if the puzzle is created by a computer or computer process, certain aspects of the creation may be controlled, manipulated or otherwise directed by an operator, as will be apparent from the discussion herein.

Particularly, the method 100, 101 of at least one embodiment of the present invention comprises selecting an audio or musical composition or clip 20 and/or a continuous portion of an audio composition 20, and selecting a graphical object 30 for use with the final puzzle, as generally shown at reference character 104. For example, the audio composition 20 may include any song, instrumental, or musical composition. In addition, the audio composition or clip 20 of at least one embodiment may include an audio reading of a poem, book, or other piece, spoken words, field sound recordings, sound effects, movie soundtracks, etc. The graphical object 30 of the various embodiments may include, for example, a digital or electronic image, photograph, drawing, painting, etc. In addition, the object 30 may be two or three dimensional items with visual components and structured to facilitate the practice of the present invention in the intended manner. In other embodiments, the object 30 may include moving images, animation, videos, video clips, etc.

Figure 4:
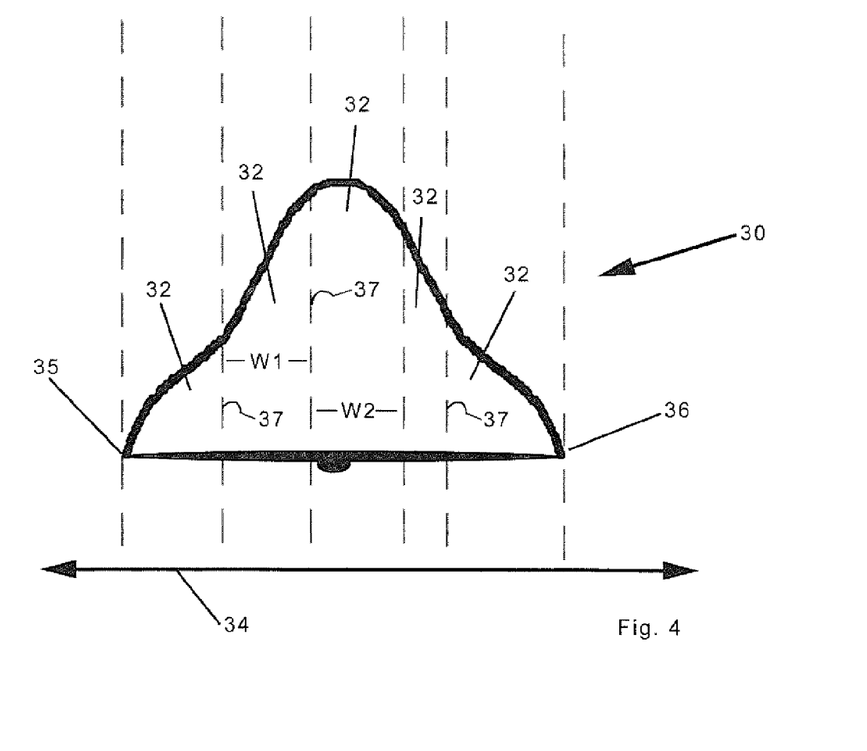
FIG. 4 is a graphical representation of the object and the various puzzle pieces associated therewith in accordance with at least one embodiment of the present invention.

In at least one embodiment, the selected musical or audio composition 20 and the graphical object 30 are at least partially related to one another in that the graphical object 30 is structured to depict, represent or otherwise visually symbolize the audio composition, e.g., the underlying meaning of the song, a description provided in the song, etc. As an example, in the event the audio composition 20, or the selected continuous segment of the audio composition 20, relates to or is otherwise descriptive in some manner to a "bell," then an appropriate digital graphical object 30 to select would be a two dimensional or three dimensional digital picture or image of a bell (as shown in FIG. 4). Of course, the object or image selected and the audio composition selected are virtually limitless. The object 30 may be two dimensional, as illustrated, or three dimensional and rotatable or otherwise maneuverable by the user.

Referring again to FIG. 2, the method 100 of at least one embodiment further comprises partitioning the audio composition 20 into a plurality of audio segments 22, and partitioning the image or graphical object 30 into a plurality of puzzle pieces 32, as collectively referenced at 106. In particular, the audio composition 20 and/or portion 21 thereof, is partitioned or otherwise broken into a plurality of audio segments 22, preferably by time, however, each of the various audio segments 22 need not be of equal lengths of time. It should be noted, however, that in other embodiments of the present invention, the audio composition 20 and/or portion 21 thereof may be partitioned into separate sounds, instruments, frequencies, etc., such that the partitioning need not be time-based. As an example, one audio segment 22 may comprise the sound of an audio frequency band (e.g., 250 Hz-500 Hz), and other segments may comprise the audio content of other frequency bands from the same program material (recording).

The graphical object 30 or image is also partitioned into separate puzzle pieces 32, as generally shown in the exemplary embodiment of FIG. 4. This partitioning may be implemented manually by a user directing a computer program or slicing module to slice or partition the object 30 as desired. In other embodiments, the slicing module may automatically or autonomously partition or slice the object into appropriate puzzle pieces 32. In one embodiment, the number of puzzle pieces 32 will correspond to the same number of audio segments 22 partitioned. However, as will be described below, at least one embodiment of the present invention further comprises one or more faux puzzle pieces which are structured to exhibit a false graphical image, a false or non-connecting configuration or shape, and/or a false (or non-existent) audio component such that it is not used to solve the puzzle.

In any event, as generally represented at reference character 108, the genuine puzzle pieces 32 are assigned a corresponding one of the audio segments 22, such that disposition of the puzzle pieces 32 into the correct solved, aligned or side-by-side orientation (as shown in FIG. 4) also aligns the corresponding or assigned audio segments 22 in the correct playable order. In particular, each of the puzzle pieces 32 includes an audio component that corresponds to one of the audio segments 22. For purposes of implementation, the audio component may simply be a pointer or other defining information or data that allows the interactive puzzle application and/or computer system of the present invention to recognize which segment 22 of the selected audio composition 20 is associated with which particular puzzle piece 32. In other words, the puzzle piece 32 may, but need not, include an object comprising the actual audio, and may instead include appropriate data points, pointers, or identifying parameters sufficient to implement the present invention in the intended manner.

Moreover, in at least one embodiment, the partitioning of the object 30 may generally include slicing or separating the object 30 into pieces or segments following a predefined or predetermined order, including, but certainly not limited to, from left to right (as shown in FIG. 4), or from top to bottom, for example. Specifically, in at least one embodiment, the object 30 is partitioned along a single axis 34 from a first end 35 to a second end 36. The partitioning lines 37 of at least one embodiment may be substantially perpendicular to the partitioning axis 34 in order to create the various puzzle pieces 32. Of course, in other embodiments, the partitioning lines 37 may be jagged, curved, rounded, angular, etc., and need not be perpendicular at all to the axis 34. In fact, the puzzle pieces 32 and/or partitioning lines 37 may, in some embodiments, be created in virtually any shape, lines, angles, curves, etc. For clarity, the partitioning axis 34 may be defined along an x-axis (horizontally, as generally shown in the drawings), along a y-axis (vertically), a z-axis (representing the depth in a three dimensional object), or any other axis or line, whether straight, curved, jagged, etc.

In any event, the single axis 34 of at least one embodiment is structured to represent a timeline associated with the audio composition 20. Specifically, in one such embodiment, each of the puzzle pieces 32 may exhibit a visual component that is substantially proportional to the assigned or associated audio component 22. For example, the visual or dimensional properties of a given puzzle piece 32 may, in some embodiments, comprise a width, height, length, area, or volume dimension that is proportional to the time dimension of the associated audio segment 22. Referring again to the example illustrated in FIGS. 3 and 4, each of the puzzle pieces 32 as shown include a width "W" that is proportional to the time "T" of the corresponding audio segment 22. Specifically, width W1 is proportional to time T1 and width W2 is proportional to time T2. Thus, a puzzle piece 32 that is associated with an audio segment 22 that is three seconds long comprises a shorter width W than a different puzzle piece that is associated with an audio segment 22 that is ten seconds long. The proportional dimensional property or component need not be the width W, and may instead be any component or characteristic of the puzzle piece 32, such as the area, volume, height, length, etc.

Figure 3:
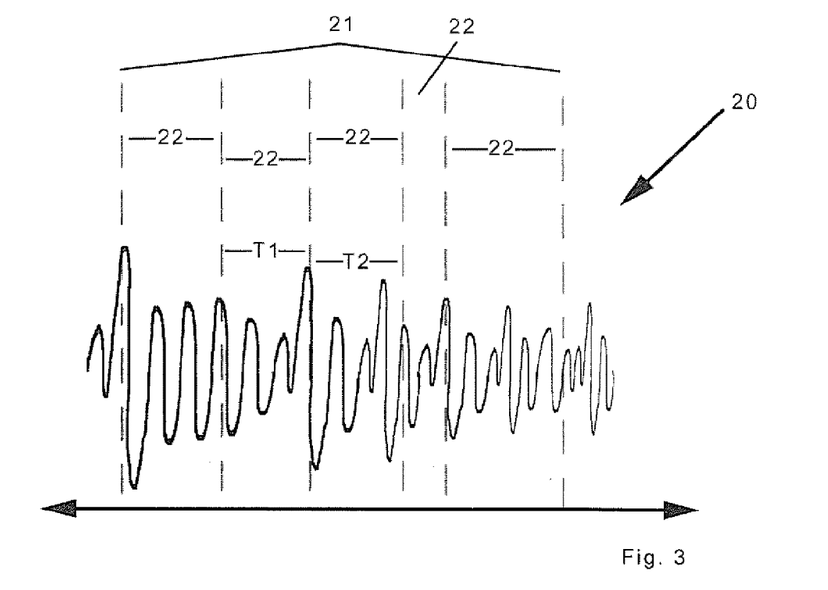
FIG. 3 is a graphical representation in waveform of an exemplary audio composition and the various audio segments associated therewith in accordance with at least one embodiment of the present invention.

It should be noted, however, that in at least one embodiment, the puzzle pieces 32, and in particular, the size properties or components thereof (e.g., width, height, area, volume, etc.) need not be proportional to the time or other component of the audio segment.

Finally, once the puzzle pieces and audio segments are generated and assigned to one another, as just described, the interactive audio visual puzzle is presented to the user on a computer display, as represented at reference character 110. As described herein, the display 16 may, but need not be touch sensitive, and can include virtually any monitor, television, handheld device, etc.

Accordingly, as will now be described, in order to play the game or otherwise solve the puzzle, as generally illustrated at 102 in the high-level flow chart of FIG. 5 and the example shown in FIGS. 6A through 6F, a user or player must recreate the visual depiction of the object 30 and the continuous portion of the audio composition 20 by disposing the puzzle pieces 32 in the correct aligned or side-by-side orientation. The player may use the visual depiction or shape/configuration of the puzzle pieces 32 to assist with the correct placement of the puzzle pieces 32. In addition, the player may also or instead use the corresponding audio component associated with the puzzle pieces in order to assist with the correct organization or placement thereof.

Figure 6A:
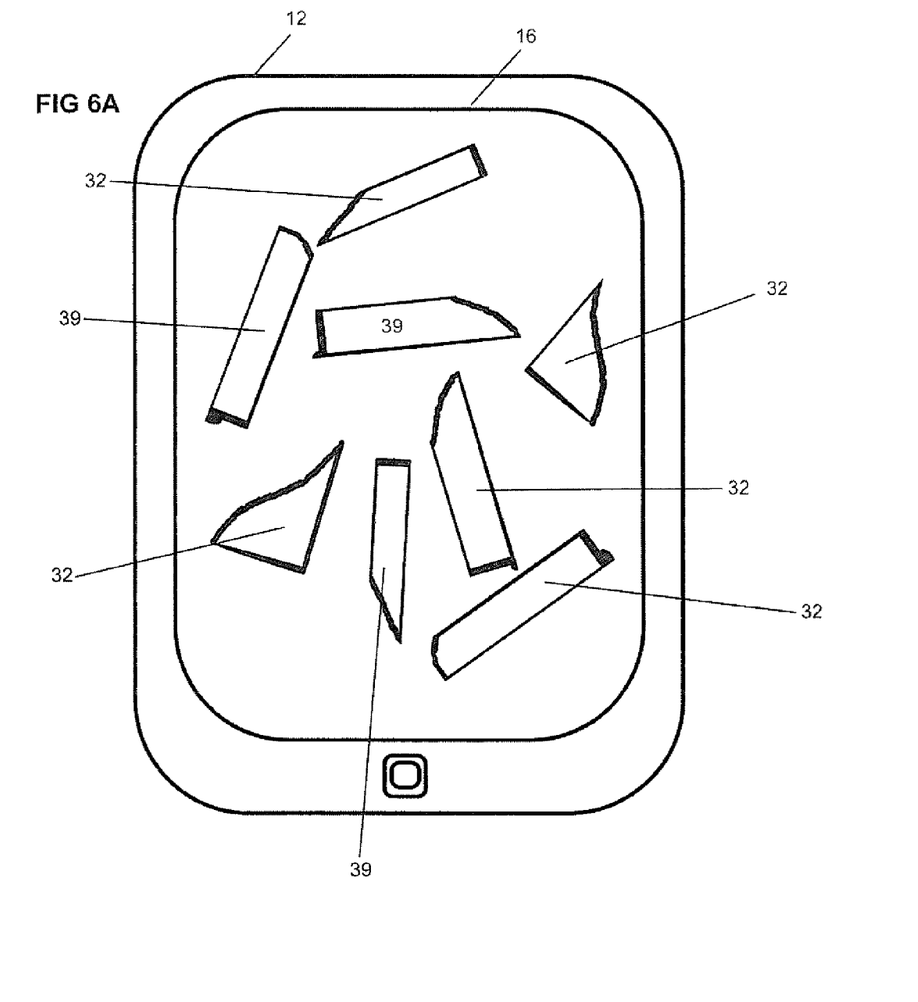
FIGS. 6A through 6F are exemplary screen shots illustrating the method shown in FIG. 5.

In particular, once the puzzle pieces 32 are created, the interactive puzzle application of the present invention is further structured to display 112 the puzzle pieces 32 on a display 16 of the computer system 12. The display 16 as shown in FIGS. 6A through 6F may be a touch-screen display commonly found on mobile telephones, tablets, personal computers and gaming systems. However, it should be apparent that the display 16 may be associated with virtually any computer system 12 as described further above. Particularly, the puzzle pieces 32 are displayed in a random fashion or otherwise scattered around the screen in a non-aligned or unsolved orientation, as illustrated in FIG. 6A.

In some embodiments, the interactive puzzle application also generates or otherwise displays one or more faux puzzle pieces 39, as briefly described above. In particular, the faux puzzle pieces 39 are not used to create the final assembled object 30 and/or do not include a correct audio component. For example, the faux puzzle piece(s) 39 of at least one embodiment comprises a similar, nearly identical or identical visual appearance as one or more of the genuine puzzle pieces 32 (by virtue of comprising a similar or identical shape or configuration), although, the faux puzzle piece 39 comprises a defunct audio component in that disposition of the faux puzzle piece 39 in the correct visually aligned orientation (in place of the genuine puzzle piece 32) will result in an incorrect collective audio portion that does not correspond to the audio composition 20. In such an embodiment, the faux puzzle piece 39 may have an audio component that is taken from the audio composition 20 but is in the wrong position, the faux puzzle piece 39 may have an audio component taken from a different audio composition (or made up), or the faux puzzle piece 39 may not have any audio component at all. In other embodiments, for instance, in cases where the audio composition is a classical musical composition, the faux puzzle piece(s) 39 may include an audio component taken from or corresponding to the correct audio segment 22, but with one note or a series of notes added, substituted or removed, resulting in a slightly different composition that, although similar to the correct composition, is not correct to complete the puzzle.

In other embodiments, the faux puzzle piece 39 may have an appropriate audio component, but does not correctly fit visually with the other puzzle pieces. In other words, a player with keen hearing may be able to identify the faux puzzle piece as comprising a correct audio component; however, the faux puzzle piece 39 will not visually fit within the completed or solved puzzle.

Figure 5:
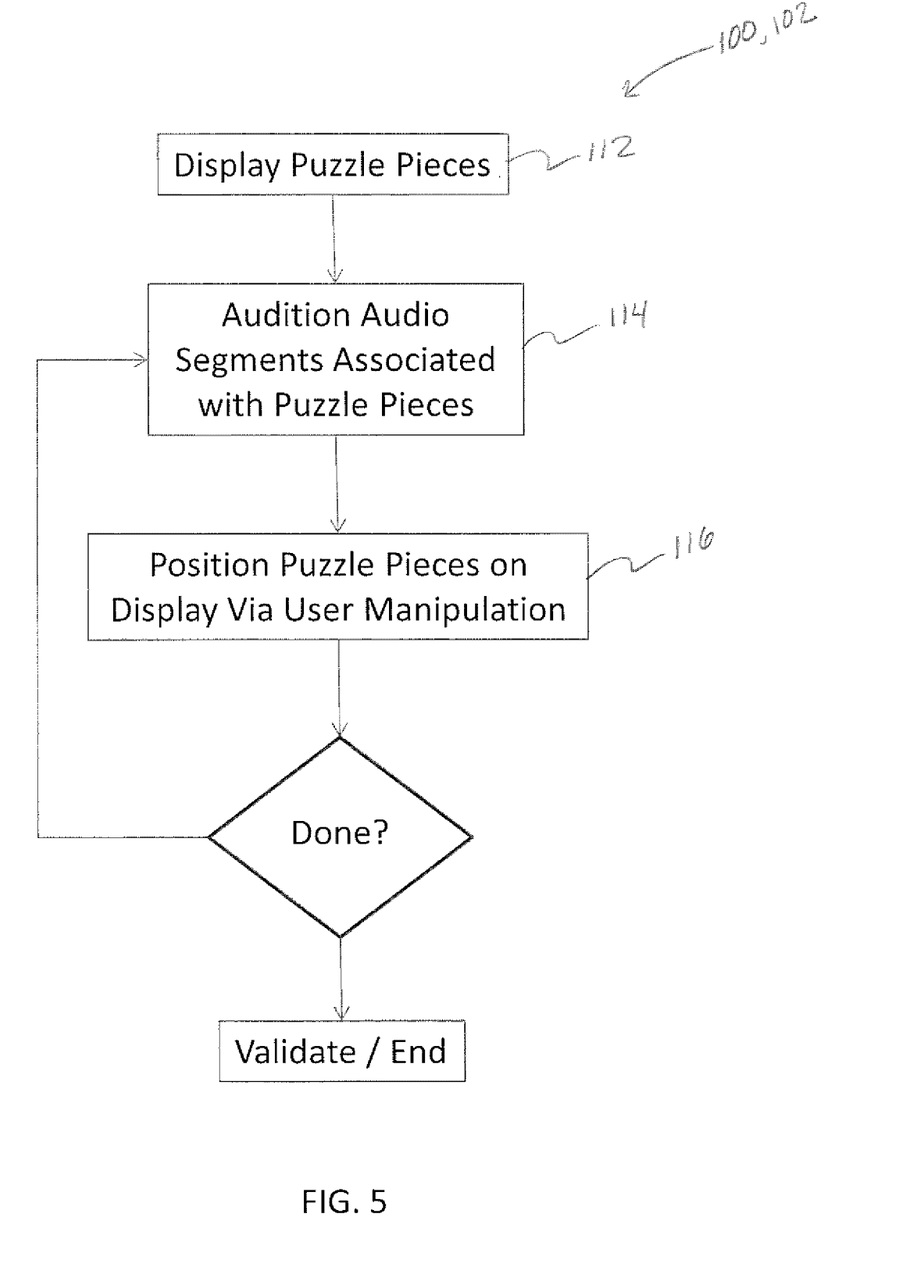
FIG. 5 is a high level flow chart of the method of solving the interactive audio-visual puzzle of the present invention.

In any event, as shown in FIG. 5 at reference character 114, the player may audition the various puzzle pieces 32 to hear the corresponding audio component associated therewith. In order to do so, the player will select one or more of the puzzle pieces, for example, by touching the puzzle piece(s) (in a touch screen application), clicking on the puzzle piece(s), pointing to the puzzle piece(s), etc., in any input configuration associated with the particular computer system 12. Once selected, the interactive puzzle application is structured to play the sound or audio associated with the audio component corresponding to the selected puzzle piece(s) 32. In one embodiment, the player must individually select and play each puzzle piece 32; however, in other embodiments, the player may select more than one puzzle piece 32 in a particular order so the interactive puzzle application of the present invention will collectively play the audio components in that particular order.

Furthermore, as represented at 116, based upon the visual representation and/or the audio component of the puzzle pieces 32, the player will position the puzzle pieces 32, for example, by dragging, rotating, or otherwise moving the puzzle pieces 32 in an attempt to dispose the puzzle pieces 32 in the correct aligned, solved and/or side-by-side orientation. Accordingly, the puzzle pieces 32 may be manipulated or moved by rotating the puzzle piece (about a two or three dimensional axis) and/or dragging the puzzle piece 32 to a different location on the screen or display 16.

The aligned, solved orientation is defined as the puzzle pieces 32 being disposed in the correct position to reconstruct the visual object and to reassemble the audio segments 22 in the appropriate and correct order corresponding to the initial audio composition 20 or portion 21 of the audio composition 20. As an example, when collectively played from left to right, the audio components of the corresponding puzzle pieces 32 will correctly play the audio composition 20 or portion 21 thereon, if the puzzle pieces 32 are disposed in the aligned, solved orientation.

In one embodiment, the system 10 is structured to reveal hints or solutions in order to assist the player in manipulating the puzzle pieces 32 into the correct solved orientation. As an example, when requested by the user, the system 10 may reveal the correct location of one or more selected puzzle pieces 32, for instance, by revealing a number corresponding to the solved position of the corresponding puzzle piece 32. Specifically, in one embodiment, the player may rotate a selected puzzle piece to an underside (or otherwise flip the puzzle piece over) by gesturing on the screen or otherwise directing the application to do so. The underside of the puzzle piece 32 may then reveal the correct solved position (e.g., by position number) of the corresponding puzzle piece 32. Other hints, partial solutions, or full solutions to the puzzle of the present invention are contemplated.

Figure 6B:
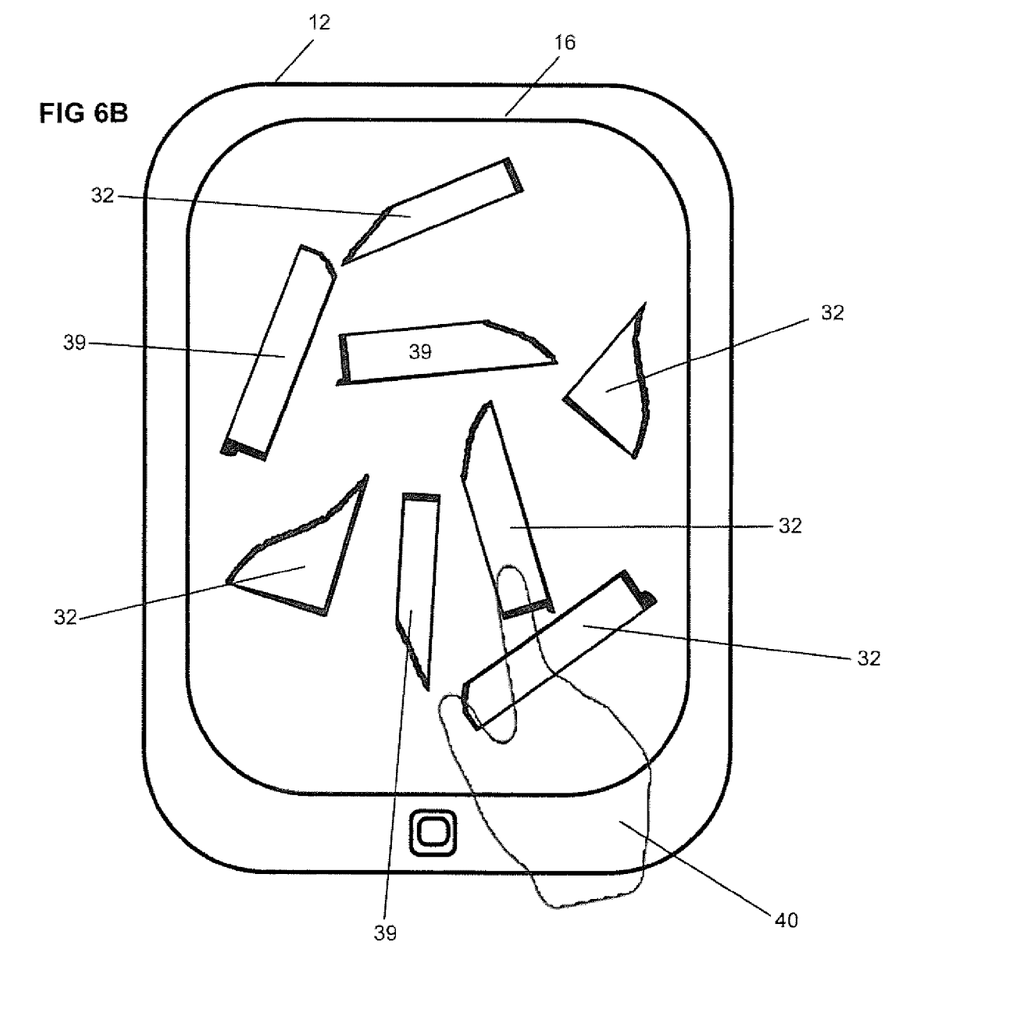

Referring now to the example illustrated in FIGS. 6A through 6F, the interactive puzzle application initially displays the puzzle pieces 32 and faux puzzle pieces 39 in a random, scattered and non-aligned orientation on the display 16 (FIG. 6A). As schematically represented in FIG. 6B, the player 40 can audition the audio components 22 associated with the puzzle pieces 32 by selecting one or more of the puzzle pieces 32. For instance, when selected, the interactive puzzle application is structured to identify the corresponding audio component 22 and play the audio to the player through the computer system 12 and the corresponding hardware.

Figure 6C:
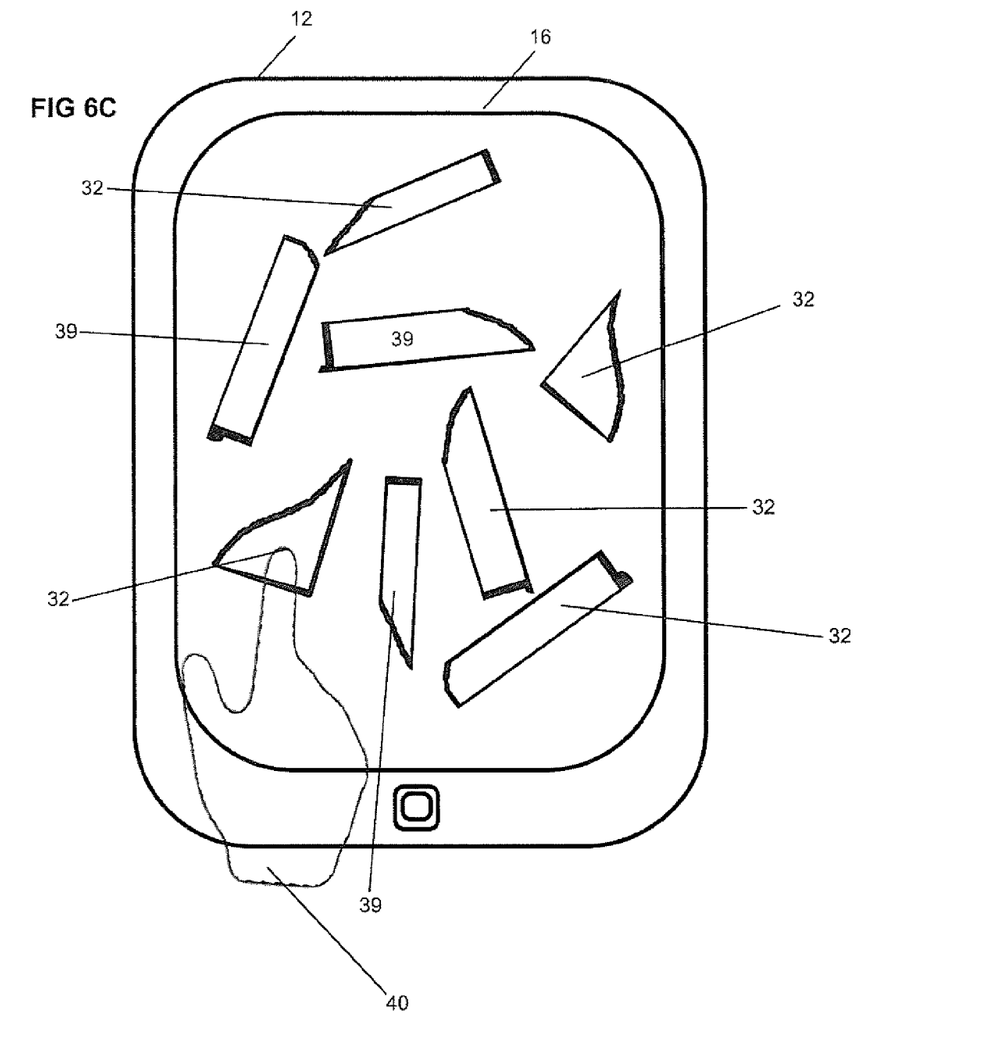
Figure 6D:
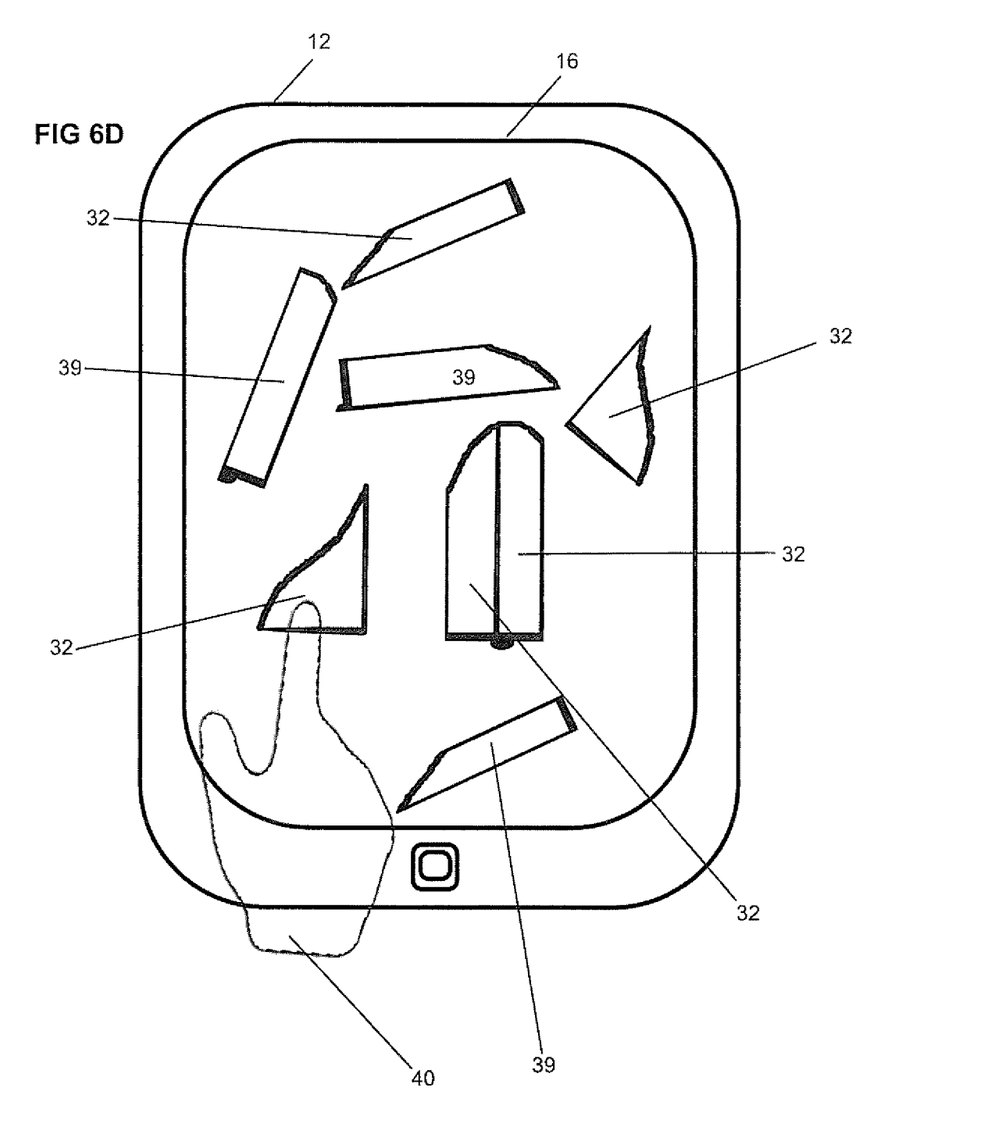
Figure 6E:
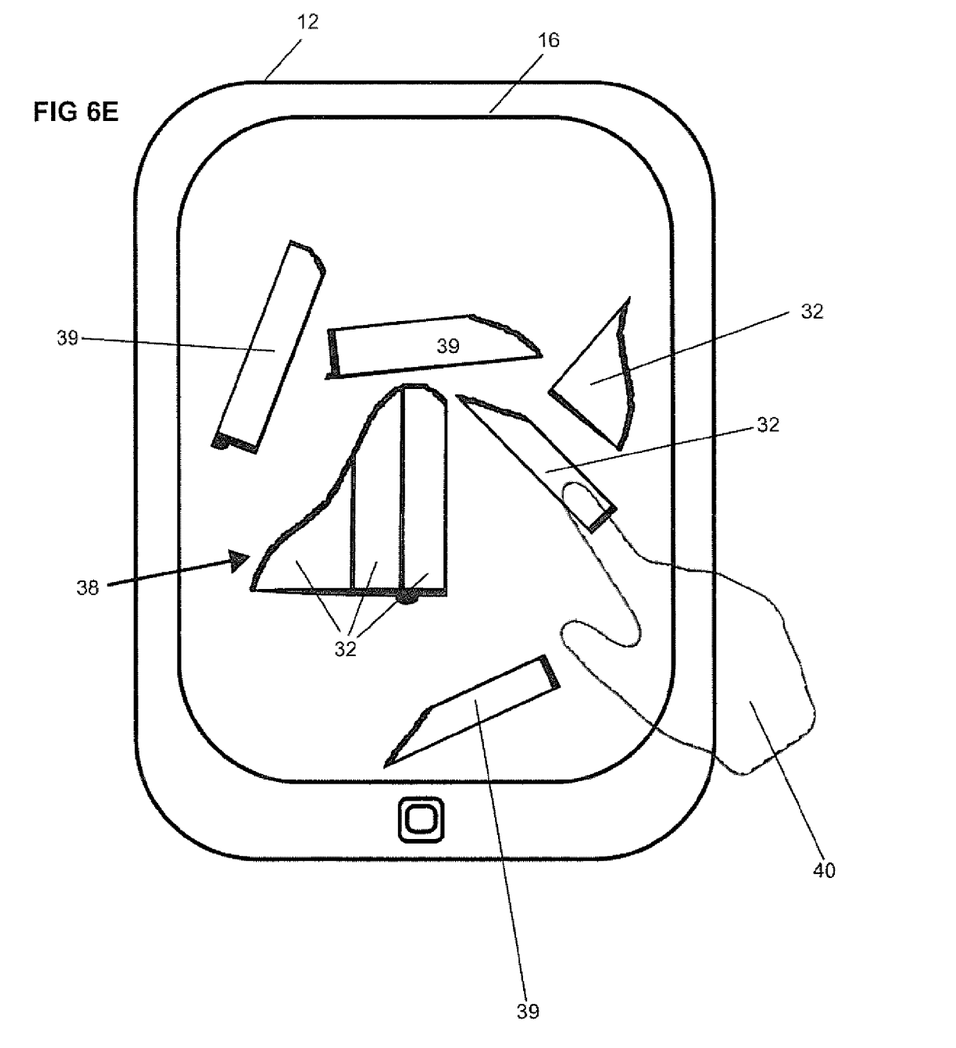
Figure 6F:
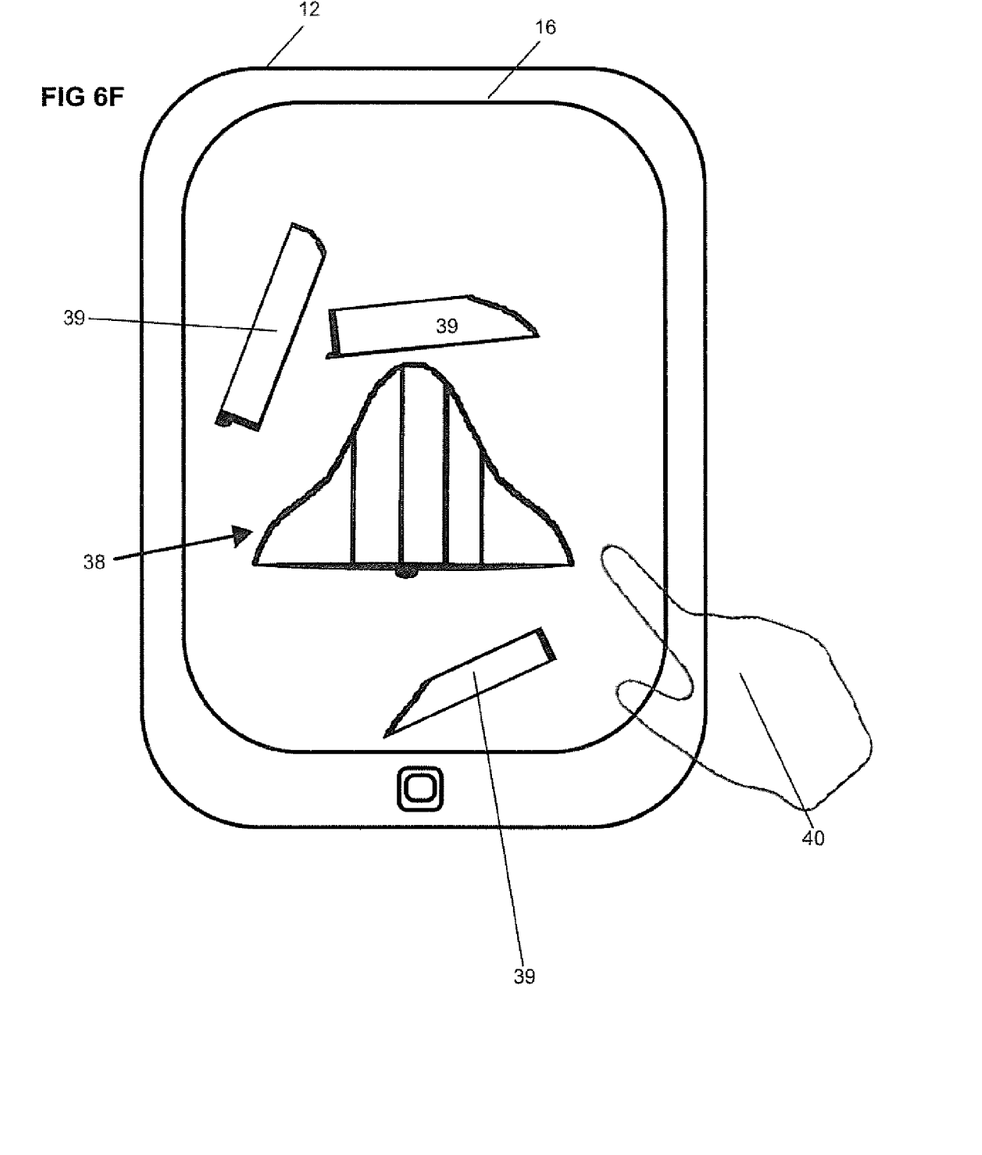

As shown in FIGS. 6C, 6D and 6E, the player can also manipulate the puzzle pieces (e.g., by rotation, dragging, etc.) and reposition them in a desired orientation. Again, the goal is to position the puzzle pieces 32 in the correct, aligned, solved orientation, as discussed above. In particular, the interactive puzzle application is structured to recognize the player's selection and manipulation of the puzzle pieces 32 and register the movements on the display 16, as shown in FIGS. 6C, 6D, and 6E. The player can also select a group of connected or aligned puzzle pieces (generally represented as 38 in FIG. 6E) in order to collectively play or audition the audio components associated with the group 38 of puzzle pieces 32. The puzzle is solved when all of the puzzle pieces 32 (excluding the faux puzzle pieces 39) are aligned in the correct orientation, as illustrated in FIG. 6F. In this case, the image of a "bell" is visible via the collective puzzle pieces 32, and the portion 21 of the audio composition 20 is correctly reassembled via the left to right orientation of the audio components of the puzzle pieces 32.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A computer-based interactive audio-visual puzzle for the arrangement of audio components associated with a plurality of puzzle pieces to collectively create a continuous audio composition, comprising:

an interactive puzzle application accessible via a computer system, the computer system comprising a computer processor, a memory device, a display, and a user input device, said interactive puzzle application structured to present a plurality of puzzle pieces on the display, said plurality of puzzle pieces being structured for user manipulated disposition into an aligned orientation, each of said plurality of puzzle pieces comprises a visual component and an audio component, each of said plurality of puzzle pieces further comprises a dimensional property that is proportional to a length of time of said corresponding audio component, at least one faux puzzle piece substantially structurally similar to at least one of said plurality of puzzle pieces and comprising an audio component corresponding to an incorrect portion of said audio composition, wherein said aligned orientation of said plurality of puzzle pieces is defined as a connected arrangement of said plurality of puzzle pieces in a side-by-side relation to one another along a single axis, wherein said single axis represents a timeline associated with said audio component from a starting puzzle piece to an ending puzzle piece, wherein said audio components of said connected arrangement of said plurality of puzzle pieces collectively represent said audio composition along said timeline, and wherein said visual components of said plurality of puzzle pieces disposed in said aligned orientation collectively and visually represent a predetermined graphical object at least partially representative of said audio composition.

2. The puzzle as recited in claim 1 wherein said dimensional property comprises a width of each of said puzzle pieces.

3. The puzzle as recited in claim 1 wherein said dimensional property comprises an area of each of said puzzle pieces.

4. The puzzle as recited in claim 1 wherein said dimensional property comprises a width of each of said puzzle pieces disposed along said single axis.

5. The puzzle as recited in claim 1 wherein said plurality of puzzle pieces each comprise a dimensional property that is non-proportional to a length of time of said corresponding audio component.

6. The puzzle as recited in claim 1 further comprising a slicing module structured to digitally and automatically segment said predetermined graphical object into said plurality of puzzle pieces to create said puzzle.

7. The puzzle as recited in claim 6 wherein said slicing module is further structured to assign said audio component to each of said plurality of puzzle pieces, wherein said audio component is proportional in time to a dimensional property of a corresponding puzzle piece.

8. A computer-based interactive audio-visual puzzle for the arrangement of audio components associated with a plurality of puzzle pieces to collectively create a continuous audio composition, comprising:
- an interactive puzzle application accessible via a computer system, the computer system comprising a computer processor, a memory device, a display, and a user input device,
- said interactive puzzle application structured to present a plurality of puzzle pieces on the display, said plurality of puzzle pieces being structured for user manipulated disposition into an aligned orientation,
- each of said plurality of puzzle pieces comprises a visual component and an audio component,
- wherein said aligned orientation of said plurality of puzzle pieces is defined as a connected arrangement of said plurality of puzzle pieces wherein said audio components of said plurality of puzzle pieces collectively represent said audio composition along a timeline defined from a starting puzzle piece to an ending puzzle piece, and wherein said visual components of said plurality of puzzle pieces collectively and visually represent a predetermined graphical object, and
- at least one faux puzzle piece comprising an incorrect visual component and a correct audio component, wherein disposition of said at least one faux puzzle piece in a connected relation with said plurality of puzzle pieces will define an incorrect aligned orientation thereon.

9. A computer-based interactive audio-visual puzzle for the arrangement of audio components associated with a plurality of puzzle pieces to collectively create a continuous audio composition, comprising:
- an interactive puzzle application accessible via a computer system, the computer system comprising a computer processor, a memory device, a display, and a user input device,
- said interactive puzzle application structured to present a plurality of puzzle pieces on the display, said plurality of puzzle pieces being structured for user manipulated disposition into an aligned orientation,
- each of said plurality of puzzle pieces comprises a visual component and an audio component,
- each of said plurality of puzzle pieces further comprises a dimensional property that is proportional to a length of time of said corresponding audio component,
- at least one faux puzzle piece comprising an audio component corresponding to an incorrect portion of said audio composition when said faux puzzle piece is disposed in said aligned orientation relative to said plurality of puzzle pieces
- wherein said aligned orientation of said plurality of puzzle pieces is defined as a connected arrangement of said plurality of puzzle pieces in a side-by-side relation to one another along a single axis, wherein said single axis represents a timeline associated with said audio component from a starting puzzle piece to an ending puzzle piece,
- wherein said audio components of said connected arrangement of said plurality of puzzle pieces collectively represent said audio composition along said timeline, and
- wherein said visual components of said plurality of puzzle pieces disposed in said aligned orientation collectively and visually represent a predetermined graphical object at least partially representative of said audio composition.

10. A computer-based interactive audio-visual puzzle for the arrangement of audio components associated with a plurality of puzzle pieces to collectively create a continuous audio composition, comprising:
- an interactive puzzle application accessible via a computer system, the computer system comprising a computer processor, a memory device, a display, and a user input device,
- said interactive puzzle application structured to present a plurality of puzzle pieces on the display, said plurality of puzzle pieces being structured for user manipulated disposition into an aligned orientation,
- each of said plurality of puzzle pieces comprises a visual component and an audio component,
- wherein said aligned orientation of said plurality of puzzle pieces is defined as a connected arrangement of said plurality of puzzle pieces wherein said audio components of said plurality of puzzle pieces collectively represent said audio composition along a timeline defined from a starting puzzle piece to an ending puzzle piece, and wherein said visual components of said plurality of puzzle pieces collectively and visually represent a predetermined graphical object, and
- at least one faux puzzle piece comprising an incorrect audio component and a correct visual component, wherein disposition of said at least one faux puzzle piece in a connected relation with said plurality of puzzle pieces will define an incorrect aligned orientation thereon.

* * * * *